US010476929B2

(12) United States Patent
Lim et al.

(10) Patent No.: US 10,476,929 B2
(45) Date of Patent: Nov. 12, 2019

(54) METHOD AND APPARATUS FOR SIGNALING AND OPERATION OF LOW DELAY CONSUMPTION OF MEDIA DATA IN MMT

(71) Applicant: Samsung Electronics Co., Ltd., Suwon-si, Gyeonggi-do (KR)

(72) Inventors: Youngkwon Lim, Allen, TX (US); Imed Bouazizi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 422 days.

(21) Appl. No.: 14/616,432

(22) Filed: Feb. 6, 2015

(65) Prior Publication Data

US 2015/0280874 A1  Oct. 1, 2015

Related U.S. Application Data

(60) Provisional application No. 61/973,097, filed on Mar. 31, 2014, provisional application No. 62/005,678, filed on May 30, 2014.

(51) Int. Cl.
*H04L 29/06* (2006.01)
*H04W 28/02* (2009.01)
(Continued)

(52) U.S. Cl.
CPC ............ *H04L 65/608* (2013.01); *H04L 47/28* (2013.01); *H04L 47/32* (2013.01); *H04W 28/02* (2013.01)

(58) Field of Classification Search
None
See application file for complete search history.

(56) References Cited

U.S. PATENT DOCUMENTS

2011/0090851 A1  4/2011  Khalil et al.
2013/0305304 A1* 11/2013  Hwang ............. H04N 21/2381
725/109
(Continued)

FOREIGN PATENT DOCUMENTS

WO  WO 2013 042999 A1  3/2013
WO  WO 2013 055149 A2  4/2013
WO  WO 2013 077662 A1  5/2013

OTHER PUBLICATIONS

"Text of ISO/IEC 2nd CD 23008-1 MPEG Media Transport", http://mpeg.chiariglione.org/standards/mpeg-h/mpeg-media-tranport/text-isoiec-2nd-cd-23008-1-mpeg-media-transport; Published Jan. 21, 2013; MPEG 103, Geneve, CH, 160 pages.

(Continued)

*Primary Examiner* — Chirag G Shah
*Assistant Examiner* — Suk Jin Kang

(57) ABSTRACT

Methods and apparatuses for wireless communication between at least one base station and user equipment, the user equipment including a transceiver and processing circuitry. The transceiver is configured to receive a packet comprising a control message with a header and a payload related to fragments of multimedia content. The header includes a message identifier indicating whether the control message is a low delay consumption message, a length of the controller message, and a version of the control message. The processing circuitry is configured to determine whether the control message is the low delay consumption message based on the message identifier. The processing circuitry is also configured to, responsive to the control message being the low delay consumption message, configure the packet based on the payload and the control message before receiving headers of the fragments of the multimedia content.

14 Claims, 4 Drawing Sheets

(51) Int. Cl.
*H04L 12/841* (2013.01)
*H04L 12/823* (2013.01)

(56) References Cited

U.S. PATENT DOCUMENTS

| | | | | |
|---|---|---|---|---|
| 2014/0105132 A1* | 4/2014 | Park | H04L 47/54 | 370/329 |
| 2014/0282799 A1* | 9/2014 | Bae | H04N 21/236 | 725/116 |
| 2014/0351874 A1* | 11/2014 | Yoo | H04N 21/6437 | 725/116 |
| 2014/0369222 A1* | 12/2014 | Kim | H04L 65/4076 | 370/252 |
| 2015/0117243 A1* | 4/2015 | Kim | H04N 17/004 | 370/252 |
| 2015/0150055 A1* | 5/2015 | Hwang | H04N 21/235 | 725/54 |
| 2015/0181003 A1* | 6/2015 | Kim | H04L 69/22 | 370/474 |
| 2015/0195159 A1* | 7/2015 | Kim | H04L 43/08 | 370/252 |
| 2015/0201207 A1* | 7/2015 | Yie | H04N 21/234 | 375/240.26 |
| 2015/0281799 A1* | 10/2015 | Lim | H04N 21/631 | 725/110 |
| 2015/0373380 A1* | 12/2015 | Tsukagoshi | H04N 21/2362 | 725/109 |
| 2016/0073137 A1* | 3/2016 | Dewa | H04H 20/28 | 725/116 |
| 2016/0088321 A1* | 3/2016 | Tsukagoshi | H04N 21/2387 | 725/25 |
| 2016/0112731 A1* | 4/2016 | Tsukagoshi | H04N 21/236 | 725/109 |
| 2016/0294520 A1* | 10/2016 | Tsukagoshi | H04N 21/2362 | |
| 2016/0295257 A1* | 10/2016 | Iguchi | H04N 5/38 | |
| 2016/0337672 A1* | 11/2016 | Lee | H04N 21/236 | |
| 2016/0373789 A1* | 12/2016 | Tsukagoshi | H04N 21/235 | |

OTHER PUBLICATIONS

International Search Report dated Jun. 22, 2015 in connection with Application No. PCT/KR2015/003116, 3 pages.
Written Opinion of the International Searchiung Authority dated Jun. 22, 2015 in connection with Application No. PCT/KR2015/003116, 5 pages.
Seo et al.; "A New Timing Model Design for MPEG Media Transport (MMT)"; 2012 IEEE International Symposium on Broadband Multimedia Systems and Broadcasting (BMSB); Seoul, South Korea; Jun. 27-29, 2012; 5 pages.
MPEG-H Systems; "International Organization for Standardization Coding of Moving Pictures and Audio"; ISO/IEC JTC1/SC29/WG11 ; MPEG/N13293; Geneva, Switzerland; Jan. 2013; 152 pages.
Foreign Communication from Related Counterpart Application; European Patent Application No. 15773549.9; Extended European Search Report and European Search Opinion dated Apr. 3, 2018; 9 pages.

* cited by examiner

METHOD AND APPARATUS FOR SIGNALING AND OPERATION OF LOW DELAY CONSUMPTION OF MEDIA DATA IN MMT

CROSS-REFERENCE TO RELATED APPLICATION AND CLAIM OF PRIORITY

The present application claims priority under 35 U.S.C. § 119(e) to U.S. Provisional Patent Application Ser. No. 61/973,097, filed Mar. 31, 2014, entitled "METHODS AND APPARATUS FOR SIGNALING AND OPERATION OF LOW DELAY CONSUMPTION OF MEDIA DATA IN MMT" and U.S. Provisional Patent Application Ser. No. 62/005,678, filed May 30, 2014, entitled "METHODS AND APPARATUS FOR SIGNALING AND OPERATION OF LOW DELAY CONSUMPTION OF MEDIA DATA IN MMT". The above-identified provisional patent applications are hereby incorporated by reference in their entirety.

TECHNICAL FIELD

The present application relates generally to media data delivery in a transmission system and, more specifically, to signaling and operation of a Moving Picture Experts Group (MPEG) media transport (MMT) protocol (MMTP) de-capsulation buffer.

BACKGROUND

MMT is a digital container standard or format that specifies technologies for the delivery of coded media data for multimedia service over heterogeneous IP network environments. The delivered coded media data includes both audio-visual media data requiring synchronized decoding and presentation of a specific unit of data in a designated time, namely timed data, and other types of data that are decoded and presented in an arbitrary time based on the context of service or interaction by the user, namely non-timed data.

MMT is designed under the assumption that the coded media data will be delivered through a packet-based delivery network using Internet Protocols (IPs), such as real-time transport protocol (RTP), transmission control protocol (TCP), user datagram protocol (UDP), etc. MMT is also designed with consideration for characteristics of different delivery environments.

SUMMARY

This disclosure provides signaling and operation of an MMTP de-capsulation buffer.

In a first embodiment, an apparatuses is provided for wireless communication between at least one base station and user equipment that includes a transceiver and processing circuitry. The transceiver is operable to communicate with the at least one base station by transmitting radio frequency signals to the at least one base station and by receiving radio frequency signals from the at least one base station. The transceiver is configured to receive a packet comprising a control message with a header and a payload related to fragments of multimedia content. The header includes a message identifier indicating whether the control message is a low delay consumption message, a length of the controller message, and a version of the control message. The processing circuitry is configured to determine whether the control message is the low delay consumption message based on the message identifier. The processing circuitry is also configured to, responsive to the control message being the low delay consumption message, configure the packet based on the payload and the control message before receiving headers of the fragments of the multimedia content.

In a second embodiment, an method is provided for wireless communication between at least one base station and user equipment. The method includes receiving a packet comprising a control message with a header and a payload related to fragments of multimedia content. The header includes a message identifier indicating whether the control message is a low delay consumption message, a length of the controller message, and a version of the control message. The method also includes determining whether the control message is the low delay consumption message based on the message identifier. The method also includes, responsive to the control message being the low delay consumption message, configuring the packet based on the payload and the control message before receiving headers of the fragments of the multimedia content.

In a third embodiment, a system is provided for wireless communication between at least one base station and user equipment that includes a transceiver and processing circuitry. The transceiver is operable to communicate with the at least one base station by transmitting radio frequency signals to the at least one base station and by receiving radio frequency signals from the at least one base station. The transceiver is configured to receive a packet comprising a control message with a header and a payload related to fragments of multimedia content. The header includes a message identifier indicating whether the control message is a low delay consumption message, a length of the controller message, and a version of the control message. The processing circuitry is configured to determine whether the control message is the low delay consumption message based on the message identifier. The processing circuitry is also configured to, responsive to the control message being the low delay consumption message, configure the packet based on the payload and the control message before receiving headers of the fragments of the multimedia content.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, "A and B", "A and C", "B and C", and "A and B and C".

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
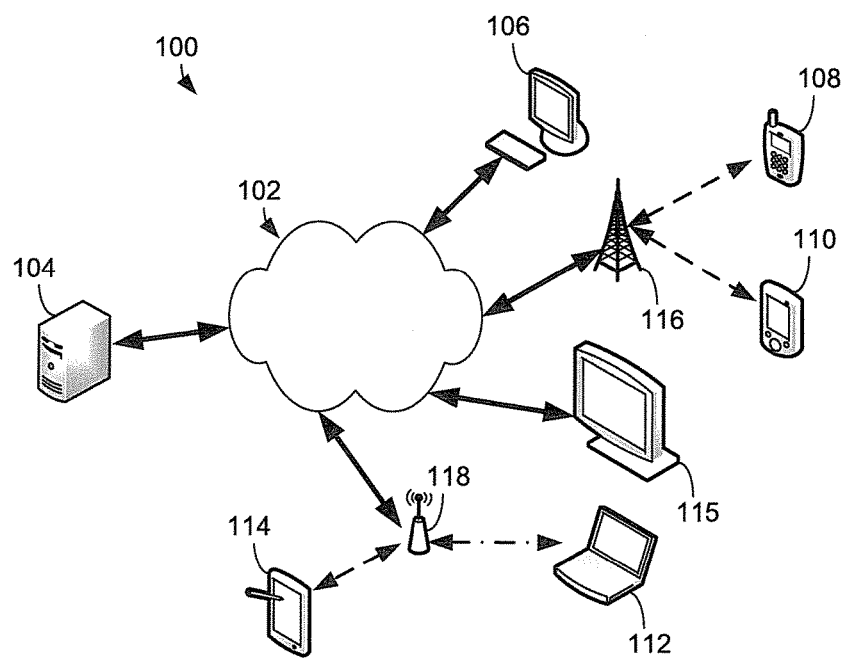
FIG. 1 illustrates an example communication system in which various embodiments of the present disclosure may be implemented.

FIGS. 1 through 7, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

MMT coding and media delivery is discussed in the following document and standards description: ISO/IEC JTC 1/SC29/WG11, High efficiency coding and media delivery in heterogeneous environments—Part 1: MPEG Media Transport (MMT), July 2012, which is hereby incorporated into the present disclosure as if fully set forth herein. For efficient and effective delivery of coded media data over heterogeneous IP network environments, MMT provides: a logical model to construct a content composed of various components for mash-up applications; the structure of data conveying information about the coded media data for the delivery layer processing, such as packetization and adaptation; a packetization method and packet structure to deliver media content agnostic to a specific type of media or coding method used over TCP or UDP, including hybrid delivery; a format of signaling messages to manage presentation and delivery of media content; a format of signaling messages to manage presentation and delivery of media content; and a format of information to be exchanged across the layers to facilitate cross-layer communication.

MMT defines three functional areas including encapsulation, delivery, and signaling. The encapsulation functional area defines the logical structure of media content, the MMT package, and the format data units to be processed by an MMT compliant entity. An MMT package specifies components including media content and the relationship among the media content to provide information needed for adaptive delivery. The format of the data units is defined to encapsulate the coded media to either be stored or carried as a payload of a delivery protocol and to be easily converted between storage and carrying. The delivery functional area defines the application layer protocol and format of the payload. The application layer protocol provides enhanced features, including multiplexing, for delivery of the MMT package compared to conventional application layer protocols for the delivery of multimedia. The payload format is defined to carry coded media data that is agnostic to the specific media type or encoding method. The signaling functional area defines the format of messages to manage delivery and consumption of MMT packages. Messages for consumption management are used to signal the structure of the MMT package, and messages for delivery management are used to signal the structure of payload format and configuration of the protocol.

MMT defines a new framework for delivery of time continuous multimedia, such as audio, video, and other static content, such as widgets, files, etc. MMT specifies a protocol (i.e., MMTP) for the delivery of an MMT package to a receiving entity. The MMTP signals transmission time of the MMTP package as part of the protocol header. This time enables the receiving entity to perform de-jittering by examining the transmission time and reception time of each incoming MMT packet.

Embodiments of the present disclosure recognize and take into consideration that the MMT specification enables low delay transmission of ISOBMFF files but it does not provide appropriate information for low delay consumption.

FIG. 1 illustrates an example communication system 100 in which various embodiments of the present disclosure may be implemented. The embodiment of the communication system 100 shown in FIG. 1 is for illustration only. Other embodiments of the communication system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may also be a heterogeneous network including broadcasting networks, such as cable and satellite communication links. The network 102 may include one or more local area networks (LANs): metropolitan area networks (MANs); wide area networks (WANs); all or a portion of a global network, such as the Internet; or any other communication system or systems at one or more locations.

The network 102 facilitates communications between at least one server 104 and various client devices 106-115. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-115 represents any suitable computing or processing device that interacts with at least one server or other computing device(s) over the network 102. In this example, the client devices 106-115 include a desktop computer 106, a mobile telephone or smartphone 108, a personal digital assistant (PDA) 110, a laptop computer 112, tablet computer 114; and a set-top box and/or television 115. However, any other or additional client devices could be used in the communication system 100.

In this example, some client devices 108-114 communicate indirectly with the network 102. For example, the client devices 108-110 communicate via one or more base stations 116, such as cellular base stations or eNodeBs. Also, the client devices 112-115 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

As described in more detail below, network 102 facilitates communication of media data, for example, such as images, video, and/or audio, from server 104 to client devices 106-115 using MMTP. Given that MMT is also designed with consideration for characteristics of different delivery environments, the server 104 may broadcast or stream the media data over the network to client devices 106-115 using MMTP. Additionally, the server 104 may provide buffer removal mode signaling via a message to indicate MMTP de-capsulation buffer operation and management MMTP de-capsulation buffer together with or separately from the media data.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
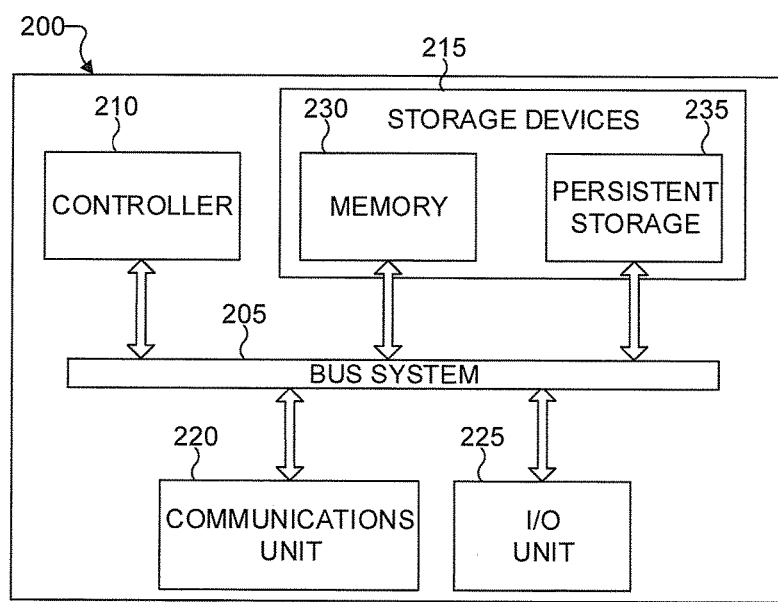
FIGS. 2 and 3 illustrate example devices in a communication system according to this disclosure.
Figure 3:
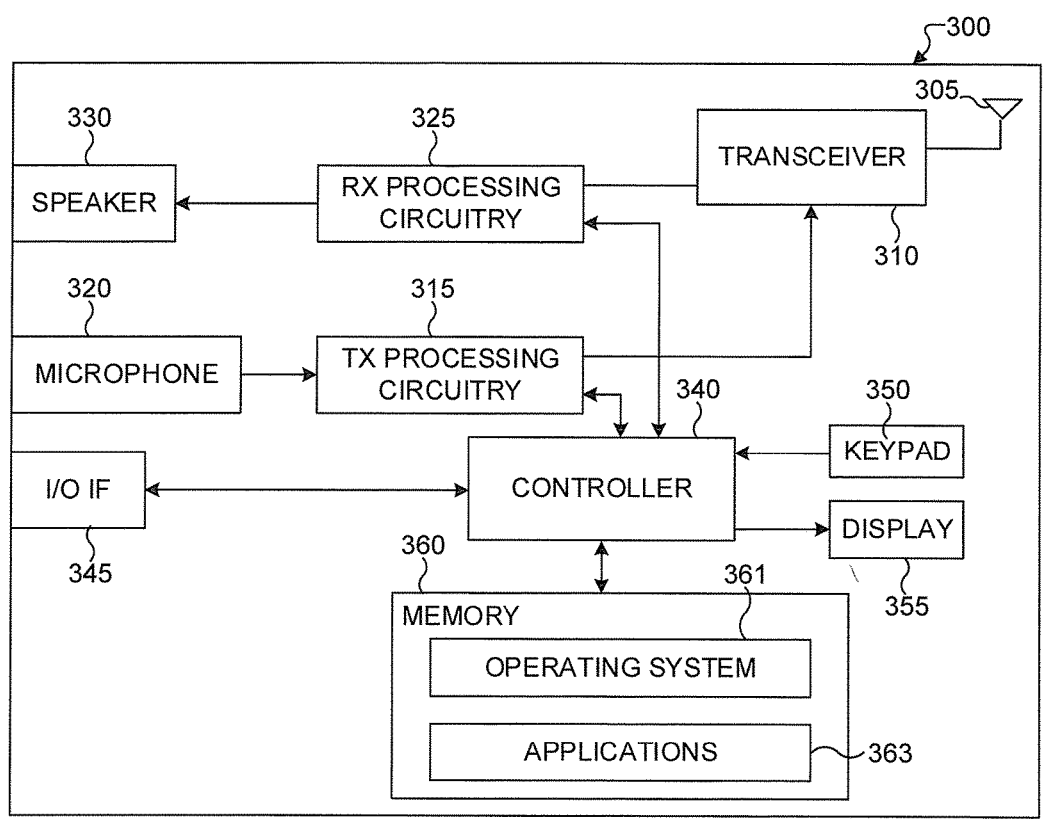

FIGS. 2 and 3 illustrate example devices in a computing system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-115 in FIG. 1.

As shown in FIG. 2, the server 200 includes a bus system 205, which supports communication between at least one controller 210, at least one storage device 215, at least one communications unit 220, and at least one input/output (I/O) unit 225.

The controller 210 executes instructions that may be loaded into a memory 230. The controller 210 may include any suitable number(s) and type(s) of processors or other devices in any suitable arrangement. Example types of controllers 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a read-only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the client devices 106-115. For example, a laptop or desktop computer could have the same or similar structure as that shown in FIG. 2.

As described in more detail below, the server 200 sends media data and/or buffer removal mode signaling via a message to indicate MMTP de-capsulation buffer operation and management MMTP de-capsulation buffer together with or separately from the media data. In one example, the server 200 may be a broadcast entity for broadcasting media data over an IP network.

As shown in FIG. 3, the client device 300 includes an antenna 305, a transceiver 310, transmit (TX) processing circuitry 315, a microphone 320, and receive (RX) processing circuitry 325. The client device 300 also includes a speaker 330, a controller 340, an input/output (I/O) interface (IF) 345, a keypad 350, a display 355, and a memory 360. The memory 360 includes an operating system (OS) 361 and one or more applications 363.

The transceiver 310 receives, from the antenna 305, an incoming RF signal transmitted by another component in a system. The transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the controller 340 for further processing (such as for web browsing data).

The TX processing circuitry 315 receives analog or digital voice data from the microphone 320 or other outgoing baseband data (such as web data, e-mail, or interactive video game data) from the controller 340. The TX processing circuitry 315 encodes, multiplexes, and/or digitizes the outgoing baseband data to generate a processed baseband or IF signal. The transceiver 310 receives the outgoing processed baseband or IF signal from the TX processing circuitry 315 and up-converts the baseband or IF signal to an RF signal that is transmitted via the antenna 305.

The controller 340 can include one or more processors or other processing devices and execute the basic operating system 361 stored in the memory 360 in order to control the overall operation of the client device 300. For example, the controller 340 could control the reception of forward channel signals and the transmission of reverse channel signals by the transceiver 310, the RX processing circuitry 325, and the TX processing circuitry 315 in accordance with well-known principles. In some embodiments, the controller 340 includes at least one microprocessor or microcontroller.

The controller 340 is also capable of executing other processes and programs resident in the memory 360. The controller 340 can move data into or out of the memory 360 as required by an executing process. In some embodiments, the controller 340 is configured to execute the applications 363 based on the operating system 361 or in response to signals received from external devices or an operator. The controller 340 is also coupled to the I/O interface 345, which provides the client device 300 with the ability to connect to other devices, such as laptop computers and handheld computers. The I/O interface 345 is the communication path between these accessories and the controller 340.

The controller 340 is also coupled to the keypad 350 and the display 355. The operator of the client device 300 can use the keypad 350 to enter data into the client device 300. The display 355 may be a liquid crystal display or other display capable of rendering text and/or at least limited graphics, such as from web sites.

The memory 360 is coupled to the controller 340. Part of the memory 360 could include a random access memory (RAM), and another part of the memory 360 could include a Flash memory or other read-only memory (ROM).

As described in more detail below, the client device 300 receives a low delay consumption (LDC) message. For example, the client device 300 may receive and process media data according to LDC. In one example, the client device 300 may be a mobile device that receives broadcast media data over an IP network.

Although FIGS. 2 and 3 illustrate examples of devices in a computing system, various changes may be made to FIGS. 2 and 3. For example, various components in FIGS. 2 and 3 could be combined, further subdivided, or omitted, and additional components could be added according to particular needs. As a particular example, the controller 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices including, for example, without limitation, a set-top box, a television, and a media streaming device. In addition, as with computing and communication networks, client devices and servers can come in a wide variety of configurations, and FIGS. 2 and 3 do not limit this disclosure to any particular client device or server.

Figure 4:
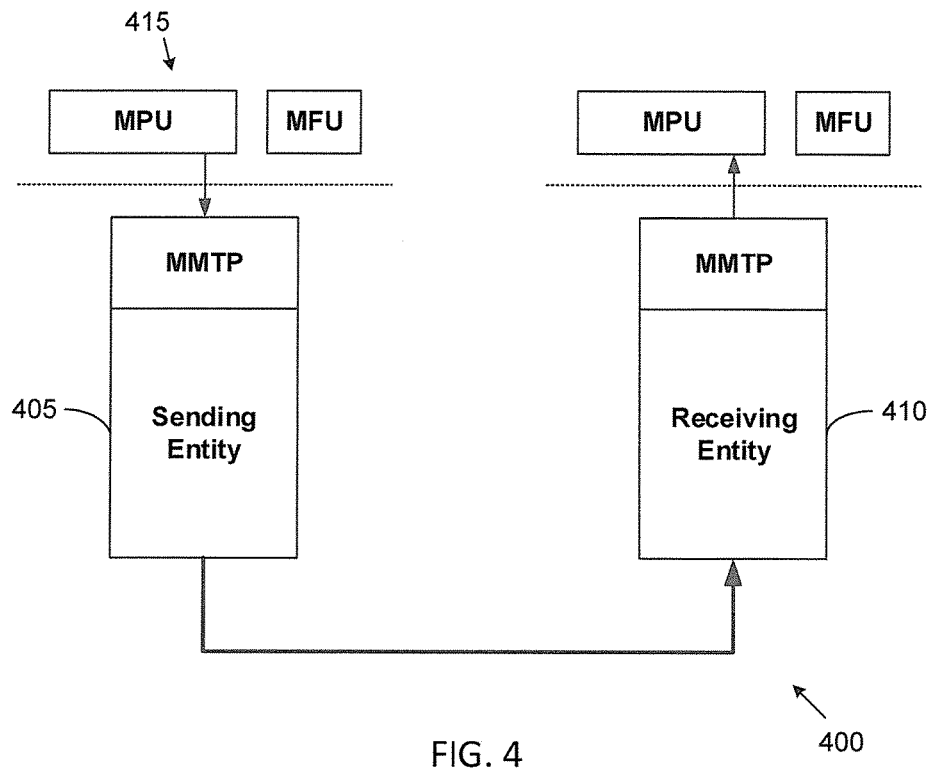
FIG. 4 illustrates an example block diagram of MMTP input/output in an MMTP data transmission environment according to this disclosure.

FIG. 4 illustrates an example block diagram of MMTP input/output in an MMTP data transmission environment 400 according to this disclosure. In this illustrative example, a sending entity 405, for example, a server, such as the server 200 in FIG. 2, sends media data over a transmission medium to a receiving entity 410, for example, a client device such as the client device 300 in FIG. 3, according to MMTP. The media data 415 is processed at the sending entity 405 according to MMTP. For example, the sending entity 405 may perform MMT package encapsulation, coding, delivery, and signaling for the media data as MMT processing units (MPUs) and MMT fragmentation units (MFUs) (e.g., fragments of an MPU). The processed media data is then sent (e.g., as packets) to the receiving entity 410 for processing (e.g., de-capsulation, decoding, etc.) according to MMTP. The media data processed at the receiving entity 410 is then passed up to an upper layer programming (e.g., an application layer program, such as a media player) as MPUs and/or MFUs for presentation to a user on a visual and/or audio display device completing delivery of the media data.

Figure 5:
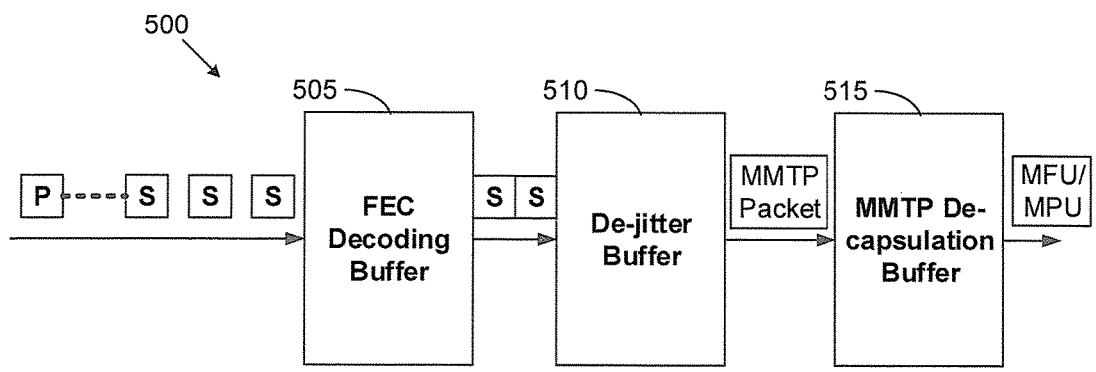
FIG. 5 illustrates a block diagram of an example receiver buffer model for simulating the receiver behavior at the receiver side and for estimating a buffer delay and size requirement according to this disclosure.

FIG. 5 illustrates a block diagram of an example receiver buffer model 500 for simulating the receiver behavior at the receiver side and for estimating a buffer delay and size requirement according to this disclosure. In various embodiments of the present disclosure, a sending entity 405, such as a media-delivery server (or other MMT aware node), calculates, determines, and/or identifies a fixed end-to-end delay for media data delivery in the point-to-multipoint transmission system. For example, the sending entity 405 may utilize model 500 to determine effects of media data processing performed on the packet stream on reception constraints in a receiver of a receiving entity 410. For example, the sending entity 405 may utilize the model to determine a required buffering delay and a required buffer size and communicate this information to entities receiving the media data.

In this illustrative example, the FEC decoding buffer 505 is a model for estimating a delay and/or buffer size requirement associated with FEC decoding. FEC decoding is typical for many applications, where lower layer transmission may not be sufficient to recover from channel errors or when network congestion may cause packet drops or excessive delays. To perform FEC decoding, the receiving entity 410 uses a buffer where incoming packets are stored until sufficient source ("S") and repair data ("P" parity data) is available to perform FEC decoding.

In this illustrative example, the sending entity 405 uses the model of the FEC decoding buffer 505 to determine actions that the receiving entity 410 would take regarding FEC decoding to estimate the delay associated with FEC decoding. In other words, the sending entity 405 uses the model of the FEC decoding buffer 505 to predict actions taken by the receiving entity 410 to estimate FEC decoding delay. This modeling of the FEC decoding buffer 505 by the sending entity 405 starts with the FEC decoding buffer 505 being assumed to be initially empty. Next, for each incoming packet i with transmission timestamp ts, the receiving entity 410 buffers the packet i using the FEC decoding buffer 505, if buffer_occupancy+packet_size<max_buffer_size. Otherwise, the receiving entity 410 discards packet i as being non-conformant with the buffer model. The receiving entity 410 then determines if FEC is applied to packet i. If FEC is applied to packet i, the receiving entity 410 determines source block j to which packet i belongs, determine the insertion time t of a first packet of source block j, at time t+FEC_buffer_time moves all packets (after FEC correction, if needed) of source block j to the de jitter buffer, and discards the repair packets. The sending entity 405 utilizes the FEC_buffer_time as the required buffer time for FEC decoding from the reception of the first packet of a source block and until FEC decoding is attempted. This time is typically calculated based on the FEC block size.

The de jitter buffer 510 is a model used by the sending entity to estimate a delay and/or buffer size requirement associated with de-jittering of packets, i.e. removal of the delay jitter of packets. The de jitter buffer ultimately ensures that MMTP packets experience a fixed transmission delay from the source to the output of the MMTP protocol stack, assuming a maximum transmission delay. The receiving entity 410 may discard data units that experience a transmission delay larger than the maximum transmission delay as being very late.

This modeling of the de jitter buffer 510 by the sending entity 405 starts with the de jitter buffer being assumed to be initially empty. The receiving entity 410 then inserts an MMTP packet in the de jitter buffer 510 as the packet arrives. The receiving entity 410 then removes the MMTP packet at time ts+Δ, where ts is the transmission timestamp of the MMTP packet and A is the fixed end-to-end delay that is signaled for the media data. After the de-jittering is applied, all MMTP packets that arrived correctly (or were recovered through FEC/retransmissions) will have experienced the same end-to-end delay.

The MMTP de-capsulation buffer 515 is a model used by the sending entity to estimate a delay and/or buffer size requirement associated with MMTP processing before passing the output to the upper layers. The output of the MMTP processor may either be the MFU payload (in low-delay operation), a complete movie fragment, or a complete MPU. MPUs may be fragmented into smaller packets or aggregated into larger packets, depending on their size. The de-capsulation (removal of the MMTP packet and payload headers) and any required de-fragmentation/de-aggregation of the packets is then performed as part of the MMTP processing. This procedure may require some buffering delay, called de-capsulation delay, to perform assembly when an MPU is fragmented into multiple MMTP packets. However, in this illustrative embodiment, de-capsulation delay may not be considered as part of the fixed end-to-end delay, and the availability of an MPU for consumption by the coded media layer can be guaranteed by the entity fragmenting the MPU into multiple MMTP packets, regardless of the de-capsulation delay. While used as a model by the sending entity 405, each of the buffers 505, 510, and 515 may be implemented in the memory of a receiving entity, such as, for example, memory 360 of client device 300.

In various embodiments of the present disclosure, the MMTP de-capsulation buffer 515 may operate as follows. The MMTP de-capsulation buffer 515, when initially empty, receives an MMTP packet after the de-jittering is performed by the de jitter buffer 510. For MMTP packets carrying aggregated payload, the receiving entity 410 removes the packet and payload header and extracts each single data unit. For MMTP packets carrying fragmented payload, the packet is kept in the buffer until all corresponding fragments are received correctly or until a packet is received that does not belong to the same fragmented data unit. As discussed in greater detail below, depending on the operation mode of the client, if a complete MPU, a movie fragment, or a single MFU is recovered, the sending entity 405 forwards the reconstructed data to an upper layer, such as a presentation layer, for display to a user.

As discussed above, the LDC defines a presentation order for a numbers of samples before receiving metadata, such as movie fragment headers. Embodiments of the present disclosure further provide a message to signal information used and/or required to calculate the presentation time of each sample before starting removal of data from the MMTP de-capsulation buffer 515.

Accordingly, embodiments of the present disclosure provide for low delay consumption (LDC) messages that provide information required to decode and present media data by the client before it receives metadata such as movie fragment headers. This message indicates that the duration of each sample is fixed as signaled by default_sample_duration in a Track Extends Box and the coding dependency structure is fixed across an asset. When this message is used, the value of decoding time of the first sample of MPU is smaller than the presentation time of the first sample of the MPU by the sum of fixed_presentation_time_offset and the largest value of sample_composition_time_offset_value paired sample_composition_time_offset_sign is '1.'

Table 1 below provides example syntax for the LDC message:

TABLE 1

| Syntax | No. of bits |
|---|---|
| low_delay_consumption ( ){ | |
|   message_id | 16 |
|   Version | 8 |
|   Length | 16 |
|   extension { | |
|     extension_fields_Byte | |
|   } | |
|   message_payload{ | |
|     base_presentation_time_offset | 31 |
|     coding_dependency_structure_flag | 1 |
|     if (coding_dependency_structure_flage == 1){ | |
|       period_of_intra_coded_sample | 8 |
|       for (i=0 ; i<period_of_intra_coded_sample;i++){ | 8 |
|         sample_composition_time_offset_sign | 1 |
|         sample_composition_time_offset_value | 31 |
|       } | |
|     } | |
|   } | |
| } | |

In this illustrative example, "message id" indicates the identifier of the LDC message and "version" indicates the version of the LDC message. For example, an MMT receiving entity (e.g., the client device 300) can use this field to check the version of the received LDC message. Further, "length" indicates the length of the LDC messages in bytes, counting from the first byte of the next field to the last byte of the LDC message. The value '0' may not be valid for this field. Continuing, "base_presentation_time_offset" provides information about the time difference between decoding time and presentation time in microseconds. Presentation time of each sample can be greater than decoding time with this value. This may not include any difference between decoding time and presentation time of samples incurred due to reordering of decoded media data.

Additionally, "coding_dependency_structure_flag" provides indication that decoding order and presentation order of samples are different each other. If this flag is set to '0', decoding order shall be same with presentation order of samples. If this flag is set to '1', decoding order shall be different from presentation order of samples and detailed composition time offset shall be provided in this message for the client to calculate appropriate decoding time and presentation time of the samples. Further, "period_of intra_coded_sample" provides the number of samples between two independently coded samples.

Figure 6:
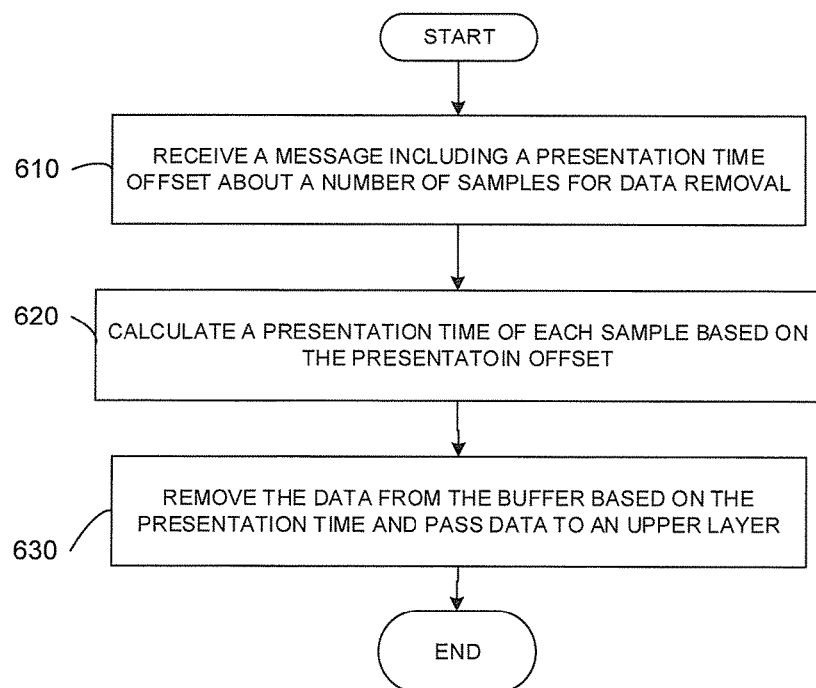
FIG. 6 illustrates a process for managing received data by a client device according to this disclosure.

FIG. 6 illustrates a process 600 for managing received data by a client device according to this disclosure. For example, the process depicted in FIG. 6 may be performed by the receiving entity 410 in FIG. 4. The process may also be implemented by the client device 300 in FIG. 3.

The process begins with the client device receiving a message comprising information about a presentation time of each sample of a plurality of samples of the data from a buffer (operation 610). For example, in operation 610, the client device receives a message comprising information about a presentation time of each sample of a plurality of samples of the data from a buffer at the client device. This message may be a LDC message, may be included with other MMT signaling messages, and/or may be included at the beginning of streaming media content to the client device. In one example, this buffer is the MMTP de-capsulation buffer 515 in FIG. 5. Around the time of receiving the message, for example, after receiving the message, the client device may start to receive the media data transmission associated with the message. The message may also be received after the media data transmission has started to be received by the client device.

The client device then calculating a presentation time of each sample of the plurality of samples (operation 620). For example, in operation 620, the LDC message may include a value of the presentation time offset, a sign of the presentation time offset, a base presentation time offset, a number of samples between independently coded samples, a coding dependency structure flag, and the like.

In an example embodiment, the coding dependency structure flag indicates whether the coding of the samples is in the same order as the presentation order. The presentation order is the order that the samples are presented for display. If the coding order is the same as the presentation order, then the samples can be removed in the same order as they are decoded. A sample of data may represent a frame.

In another example embodiment, the presentation time may be calculated by adding the base presentation time offset to a positive or negative presentation time offset. The sign indicates whether the presentation time offset is positive or negative and the value indicates a value for the presentation time offset. The value may be represented in microseconds, milliseconds, or another type of period of time. For example, if the base presentation time offset is t+40, and the presentation time offset for a sample is t+10, then the presentation time for that sample is t+50.

Thereafter, the client device removes the data from the buffer based on the presentation time and passes the reconstructed data to an upper layer (operation 630). For example, in operation 630, the client device may remove the data based on the presentation time (e.g., a presentation time offset plus a base presentation time offset). The client device passes the reconstructed data to an upper layer, such as a presentation layer, for presentation to a user on a display.

Figure 7:
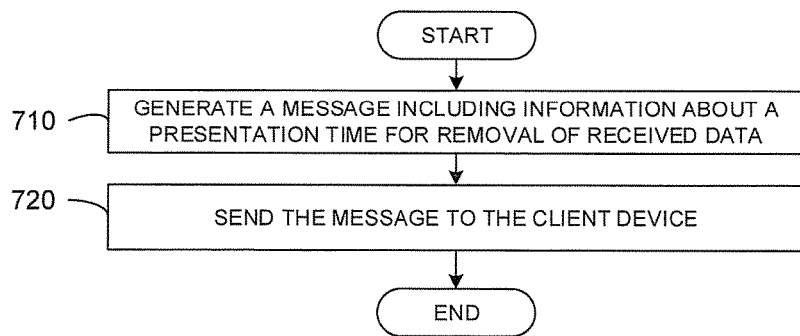
FIG. 7 illustrates a process for indicating a presentation time by a server according to this disclosure.

FIG. 7 illustrates a process 700 for indicating a presentation order by a server according to this disclosure. For example, the process depicted in FIG. 7 may be performed by the sending entity 405 in FIG. 4. The process may also be implemented by the server 200 in FIG. 2.

The process begins with the server generating a message including information about a presentation order of received data (operation 710). For example, in operation 710, the message may include a presentation time of each sample. The server may include, for example, a value and sign related to each sample of the data. The server may also include information in the message that indicates a base presentation time offset.

Thereafter, the server sends the message to the client device (operation 720). For example, in operation 720, the server sends the message to the client device to signal operation and management of data removal from the client device's MMTP de-capsulation buffer. In these examples, the server may be the same server or a different server than the server that sends the media data to the client device.

Although FIGS. 6 and 7 illustrate examples of processes for managing received data by a client device and indicating a presentation order by a server, respectively, various changes could be made to FIGS. 6 and 7. For example, while shown as a series of steps, various steps in each figure could overlap, occur in parallel, occur in a different order, or occur multiple times.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A user equipment for wireless communication with at least one base station comprising:
    a transceiver operable to communicate with the at least one base station by transmitting radio frequency signals to the at least one base station and by receiving radio frequency signals from the at least one base station, the transceiver configured to:
        receive a packet comprising a control message with a header and a payload related to fragments of multimedia content, wherein the header comprises:
            a message identifier indicating whether the control message is a low delay consumption message,
            a length of the control message, and
            a version of the control message, and wherein the payload comprises:
            a coding dependency structure flag indicating whether a decoding order of the packet is the same as a presentation order,
            a base presentation time offset indicating a base offset for presenting the fragments of the multimedia content,
            a period between two intra-coded samples,
            a sign of a sample presentation time offset for each fragment, and
            a value of the sample presentation time offset for each fragment; and
    processing circuitry configured to:
        determine whether the control message is the low delay consumption message based on the message identifier;
        responsive to the control message being the low delay consumption message, configure the packet based on the payload and the control message before receiving headers of the fragments of the multimedia content; and
        responsive to the coding dependency structure flag indicating that the decoding order of the packet is the same as the presentation order, configure the packet based on a base presentation time offset.

2. The user equipment of claim 1, wherein the processing circuitry is further configured to:

responsive to the coding dependency structure flag indicating that the decoding order of the packet is not the same as the presentation order, configure the packet based on the sample presentation time offset for each fragment, the sign, and the value.

3. The user equipment of claim 1, wherein the processing circuitry is further configured to:
responsive to the control message not being the low delay consumption message, configure the packet in sequential order.

4. The user equipment of claim 1, wherein the header further comprises:
extension information including configuration information related to the control message payload.

5. The user equipment of claim 1, wherein configuring the packet based on the sample presentation time offset for each fragment, the sign, and the value is based on the version.

6. A method for wireless communication with at least one base station comprising:
receiving a packet comprising a control message with a header and a payload related to fragments of multimedia content, wherein the header comprises:
a message identifier indicating whether the control message is a low delay consumption message,
a length of the control message, and
a version of the control message, and wherein the payload comprises:
a coding dependency structure flag indicating whether a decoding order of the packet is the same as a presentation order,
a base presentation time offset indicating a base offset for presenting the fragments of the multimedia content,
a period between two intra-coded samples,
a sign of a sample presentation time offset for each fragment, and
a value of the sample presentation time offset for each fragment; and
determining whether the control message is the low delay consumption message based on the message identifier;
responsive to the control message being the low delay consumption message, configuring the packet based on the payload and the control message before receiving headers of the fragments of the multimedia content; and
responsive to the coding dependency structure flag indicating that the decoding order of the packet is the same as the presentation order, configuring the packet based on a base presentation time offset.

7. The method of claim 6, further comprising:
responsive to the coding dependency structure flag indicating that the decoding order of the packet is not the same as the presentation order, configuring the packet based on the sample presentation time offset for each fragment, the sign, and the value.

8. The method of claim 6, further comprising:
responsive to the control message not being the low delay consumption message, configuring the packet in sequential order.

9. The method of claim 6, wherein the header further comprises:
extension information including configuration information related to the control message payload.

10. The method of claim 6, wherein configuring the packet based on the sample presentation time offset for each fragment, the sign, and the value is based on the version.

11. A system, the system comprising:
a user equipment for wireless communication with at least one base station, the user equipment comprising:
a transceiver operable to communicate with the at least one base station by transmitting radio frequency signals to the at least one base station and by receiving radio frequency signals from the at least one base station, the transceiver configured to:
receive a packet comprising a control message with a header and a payload related to fragments of multimedia content, wherein the header comprises:
a message identifier indicating whether the control message is a low delay consumption message,
a length of the control message, and
a version of the control message, wherein the payload comprises:
a coding dependency structure flag indicating whether a decoding order of the packet is the same as a presentation order,
a base presentation time offset indicating a base offset for presenting the fragments of the multimedia content,
a period between two intra-coded samples,
a sign of a sample presentation time offset for each fragment, and
a value of the sample presentation time offset for each fragment; and
processing circuitry configured to:
determine whether the control message is the low delay consumption message based on the message identifier;
responsive to the control message being the low delay consumption message, configure the packet based on the payload and the control message before receiving headers of the fragments of the multimedia content; and
responsive to the coding dependency structure flag indicating that the decoding order of the packet is the same as the presentation order, configure the packet based on a base presentation time offset.

12. The system of claim 11, wherein the processing circuitry is further configured to:
responsive to the coding dependency structure flag indicating that the decoding order of the packet is not the same as the presentation order, configure the packet based on the sample presentation time offset for each fragment, the sign, and the value.

13. The system of claim 11, wherein the processing circuitry is further configured to:
responsive to the control message not being the low delay consumption message, configure the packet in sequential order.

14. The system of claim 11, wherein the header further comprises:
extension information including configuration information related to the control message payload.

* * * * *